April 14, 1925.
T. W. DEMAREST
1,533,637
JOURNAL BOX LUBRICATOR
Filed July 18, 1921
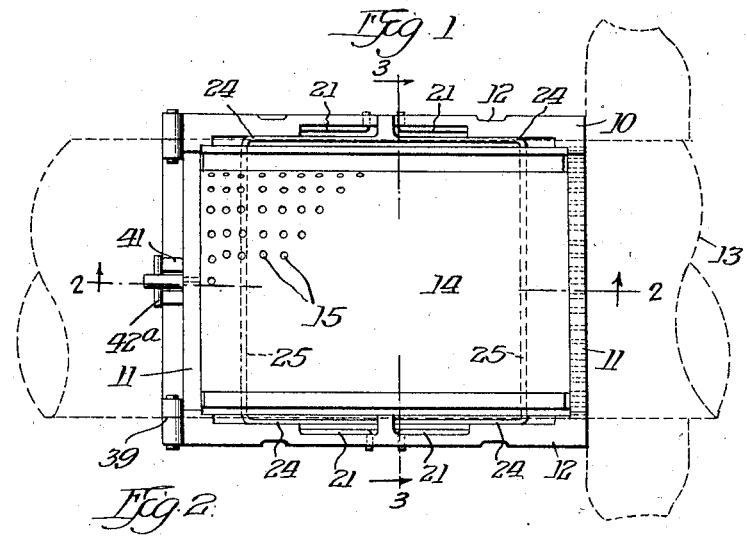
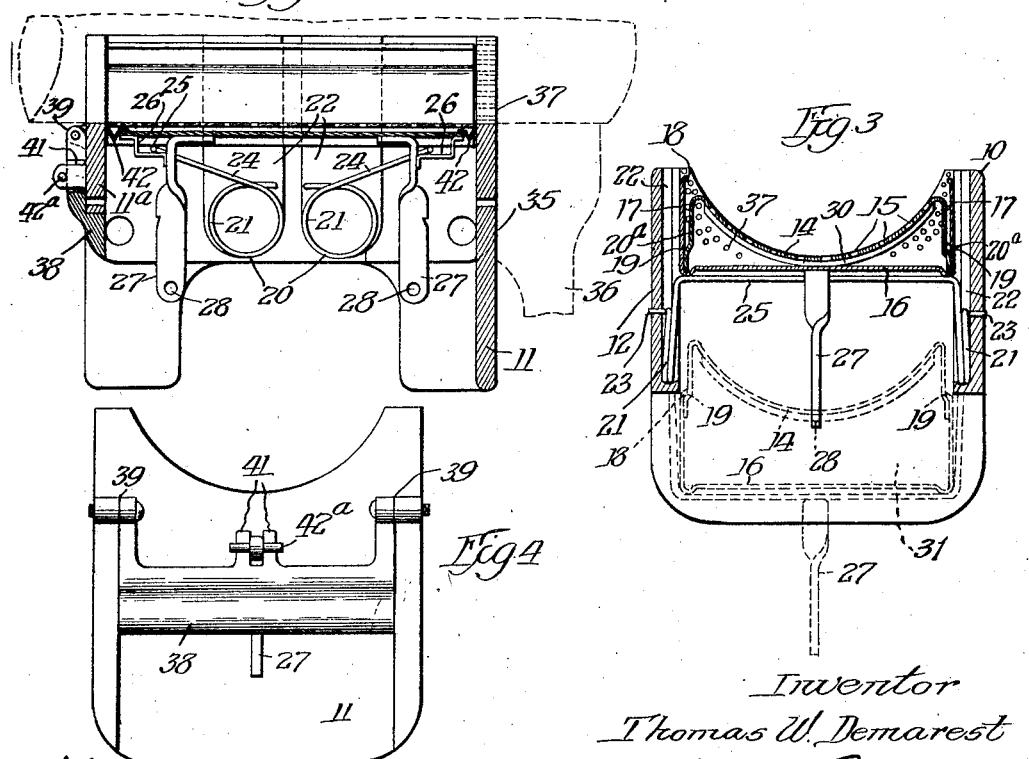
Inventor
Thomas W. Demarest Patented Apr. 14, 1925.

1,533,637

UNITED STATES PATENT OFFICE.

THOMAS W. DEMAREST, OF CHICAGO, ILLINOIS.

JOURNAL-BOX LUBRICATOR.

Application filed July 18, 1921. Serial No. 485,460.

*To all whom it may concern:*

Be it known that I, THOMAS W. DEMAREST, a citizen of the United States, and a resident of Chicago, in the county of Cook and State of Illinois, have invented certain new and useful Improvements in Journal-Box Lubricators, of which the following is a specification.

My invention relates in general to lubricators, and more particularly to pressure lubricators, and has special reference to the provision of an improved type of lubricator adapted for the automatic feeding of the lubricant to driving box journals of railway locomotives in order to insure the pressure of a continuous film of grease between the bearing surfaces of the axle and journal bearing resting upon it and thereby, as far as possible, minimize the occurrence of a hotbox and the frequent stoppages and interferences incidental thereto, and whereby not only may the life of the journal brass be greatly increased but the locomotive may be kept on the road for a longer period of time without lay-up in the shop for replacement of the journal brass, thus avoiding both the expense of new material and of labor incident to placing it in position, and also loss of the use of the locomotive, and to the provision of a lubricator adapted for the automatic feeding of lubricant to the hub side of the wheel to prevent grinding away the wheel and journal box as the axle shifts to and fro laterally.

Lubricators of the type referred to are designed particularly for feeding hard grease in bulk or cake form to locomotive driving box journals and the hub-side of the wheel and that general type in which my present invention finds perhaps its greatest field of utility includes perforated or foraminous portions which bear marginally against the journal of the driving box and against the hub of the wheel and is adapted to distribute the grease and regulate the feed thereof to the axle and to the hub of the wheel, a follower-plate or riser, which supports the grease, and a spring acting on the follower-plate or riser to keep the grease in contact with the perforated portions, all contained within a casing or cellar. Means are provided by me for pulling down the follower-plate and distributor plate, whether for inspection of the condition of the lubricator or for replacement of the grease or parts worn away in service.

The principal objects of my present invention are, generally, to improve, simplify, and cheapen the cost of producing lubricators of the character referred to; to render such lubricators less complicated in structure and more efficient in operation, and less expensive in manufacture and in the cost of maintenance; the provision of a lubricator into which grease, either in bulk or in cakes, can be introduced with equal facility; the provision of a lubricator into which fresh grease may be introduced with the greatest facility; the provision of a lubricator in which the point of location or attachment of the sustaining spring to the containing cellar is above the riser plate or grease supporting follower when the latter is in its lower position in order to permit the insertion of a fresh supply and which is below such plate when the latter is in its upper position in which the grease is brought into action on the feed or distributor plate; the provision of a spring supporting device acting on the riser-plate at a number of points so that the plate is not only supported on the bottom but also on its sides whereby any tendency towards cocking and consequent cramping in the casing is avoided; the provision of a bottomless container-cellar having continuous sides and ends adapted to contain the grease and prevent, on the one hand, any lateral exudation thereof with consequent loss, and on the other hand, the entrance of any foreign matter; the provision of a riser-plate provided with raised longitudinal sides of sufficient depth to contain the grease in such a manner as to prevent any seepage or loss of grease from the riser-plate except through the feed plate, and, of course, the inner end wall of the casing; the provision of an arrangement of a riser-plate and feed-plate so disposed that the latter may be drawn down with the riser-plate; the provision of a riser-plate arranged to interlock with the feed-plate for the same purpose; the provision of a riser-plate so arranged that it may be drawn down below the lower edges of the containing cellar for re-loading with fresh grease; the provision of a container-cellar provided with continuous ends and sides of sufficient depth, in combination with a feed-plate and riser-plate, to contain and cover the grease on all sides while the lubricator device is in operative position; together with such other objects as may hereinafter appear or be pointed out.

In attaining the objects referred to, together with such additional benefits and advantages as may be below pointed out, I have provided a construction, one embodiment of which is illustrated in the accompanying drawing wherein—

Figure 1 is a plan view of a lubricator embodying my present improvements;

Figure 2 is a longitudinal sectional elevational view thereof taken on the line 2—2 of Figure 1;

Figure 3 is a transverse sectional elevational view thereof taken on the line 3—3 of Figure 1; and Figure 4 is a front elevational view.

On referring to the drawings, it will be observed that I have indicated a topless and bottomless cellar, 10, provided with continuous ends and sides, 11 and 12, the ends, 11, being marginally curved, as is, perhaps, most clearly to be seen on viewing Figure 1, to conform to the contour of the axle, 13. Within the cellar is arranged a foraminous grease feed or distributor-plate, 14, having a number of perforations, 15, the plate, 14, being also curved, as clearly to be seen on inspection of Figure 3, to conform to the contour of the axle, 13.

Within the cellar, 10, and surrounding the feed-plate, 14, is a follower-plate or riser, 16, which carries the grease cake. This riser, 16, has upturned sides, 17, provided with inwardly turned marginal portions, 18, adapted to contact with shoulders, 19, formed on the downwardly turned sides, 20ª of the feed-plate, 14, as clearly to be seen on viewing the dotted portion of Figure 3, in order that downward movement of the riser, 16, may carry along the distributor, 14.

For sustaining the riser or follower-plate, 16, which carries the grease-cake, 31, and for pressing it upwards in order to force the grease-cake against the feed-plate, 14, and thereby press the grease, as it becomes warmed, through the apertures, 15, in the plate, 14, and so afford a continuous feed of grease to the axle, 13, I employ a number of coiled spring devices, 20, each of which is of a generally inverted U-form (see Figure 3) and is provided at each end with a number of coils, 21, which are disposed in retaining sockets, 22, formed in the walls, 12, of the cellar, 10.

The ends, 23, of the springs are inserted in openings in the sides, 12, of the cellar in order to keep the springs under compression and thereby insure that the riser, 16, is caused to approach the feed-plate, 14, as closely as the body of the interposed grease-cake will permit.

In order to afford full support for the follower, 16, at both ends thereof, the legs, 24, of the spring device, 20, are bent laterally and may be conveniently made integrally so as to continue the support of the riser or follower entirely across its ends as indicated at 25 (see Figure 1) and afford a four-point support thereto and prevent canting.

As further means for preventing any canting of the riser or follower, 16, brackets, 26, 26 are applied to the underside of the riser or follower, 16, and so arranged that the portions, 25, of the spring device shall at all times be confined to movement within the length of such brackets.

For retracting the follower, 16, from within the cellar, 10, that is withdrawing it therefrom and into the position indicated at dotted lines in Figure 3, for replacement of the grease-cake, a number of depending legs, 27, (see Figure 2) apertured, as indicated at 28, for the reception of hooks (not shown) are conveniently employed.

Inasmuch as the retraction of the riser, 16, eventually carries along with it the feed-plate, 14, owing to the contact of the marginal extensions, 18, with the shoulders, 19, above referred to, it will be perceived that a distributor-plate, 14, may be readily removed at any time for cleaning or replacement.

From inspection of Figure 3, it will also be apparent that the construction described permits the retraction of the riser or follower, 16, to a point sufficiently far below the lower margin, 29, of the cellar, 10, to permit the insertion of a fresh grease-cake between the lowermost point, 30, of the feed-plate, 14, and said riser, 16, without any interference by the outer end, 11, of the cellar, 10.

As will be understood on viewing Figure 3, care should be used in assembling the device in order to keep the spring coils, 21, well within the sockets, 22, so that such coils may not interfere with either the upward or downward movement of the riser, 16.

It has been found by experience that the hub surface, 35, of the wheel, 36, in its lateral movement to and fro and its rotary movement will tend to grind away the hub and journal box wall, 11. To overcome this tendency, I have provided the wall, 11, adjacent the hub portion, 35, of the wheel, 36, with the perforations, 37, so that the riser in forcing the grease upwardly through the perforations, 15, will also force the grease laterally through the perforations, 37, and onto the hub surface, 35.

Furthermore, where grease in bulk form is used, instead of the grease-cake above referred to, it has been found of advantage to have the wall, 11, extend downwardly (as clearly shown in Figure 2) to substantially the lowermost position the cellar assumes when retracted for filling, thus forming an abutment to prevent passage of the bulk grease longitudinally through the casing.

To provide against leakage, the packing strips, 42, 42, preferably of a generally V-form shown in Figure 2 and of resilient material, such as spring metal, rubber or the like, are secured to the riser-plate, 16, and abut against the inner surfaces of the ends of the cellar, which strips serve to retain the grease from seepage, dripping and loss.

In order to provide the opposite end wall, 11ª, with an elongated wall for a continuous bearing surface for the strip, 42, and also to prevent longitudinal expression of bulk grease, (when such is employed) as the riser moves upward after retraction for filling, and yet permit of the ready inspection of the grease in the device, I provide the door, 38, pivoted as indicated at 39 (see Figure 1) and provided at its upper end with ears, 41, arranged to embrace the lug, 40, formed on the wall, 11ª, and passing through an opening in the door, a pin, 42ª, being provided to hold the door in closed position.

Having thus described my invention and illustrated its use, what I claim as new and desire to secure by Letters Patent is—

1. In a device of the character described, in combination with a journal box, a lubricator container bodily displaceable therein, a lubricator supporting riser or follower, and means associated with said container for forcing grease between the hub face of a wheel and the journal box as the riser moves upwardly.

2. In a device of the character described, in combination with a journal box, a lubricator container bodily displaceable therein, a lubricator supporting riser or follower, the wall of the journal box adjacent to the wheel being provided with perforations for feeding grease under pressure between the hub face of the wheel and the journal box.

3. A lubricator device adapted for use as a journal lubricator comprising a casing, a lubricator supporting container including follower or riser bodily displaceable in said casing and means for simultaneously feeding grease to the journal and between the hub face of the wheel and the casing.

4. A lubricator adapted for use as a journal box lubricator, comprising, in combination, a casing and a bodily displaceable grease container therein, and said container having means for forcing grease between the hub face of a wheel and said casing.

5. In a device of the character described, in combination with an axle and a wheel, a casing having an open bottom and a lubricator supporting follower or riser in said casing, and the lower surface of a portion of the perimeter of said casing extended downwardly to form a lateral abutment bearing for the hub of said wheel.

6. In a lubricating device, in combination, a casing, and a lubricator supporting follower or riser, said casing having an open bottom with the lower surface of the perimeter of the casing in substantially the same horizontal plane on three only of its sides.

7. In a lubricating device, in combination, a casing, and a lubricator supporting follower or riser, said casing having an open bottom with such portions as lie in the lowermost plane continuous on three only of its sides.

8. In a lubricating device, in combination, a casing, and a lubricator supporting follower or riser, said casing having an open bottom and a door in one of the walls.

9. In a lubricating device, in combination, a casing, and a lubricator supporting follower or riser, said casing having an open bottom and an extension pivoted adjacent to the lower end of the casing.

10. In a lubricating device, in combination, a casing, and a lubricator supporting follower or riser, said casing having an open bottom, and a door pivoted adjacent to the lower end of the casing forming an extension thereof.

11. In a lubricating device, in combination, a casing, and a lubricator supporting follower or riser, said casing having an open bottom, and means for preventing loss of grease between the riser and the inside of the casing.

12. In a lubricating device, in combination, a casing, and a lubricator supporting follower or riser, and means for preventing loss of grease between the riser and the inside of the casing.

13. In a lubricating device, in combination, a casing, and a lubricator supporting follower or riser, and resilient means for preventing loss of grease between the riser and the inside of the casing.

14. In a lubricating device, in combination, a casing, and a lubricator supporting follower or riser, and substantially V-shaped means for preventing loss of grease between the riser and the inside of the casing.

15. In a lubricating device, in combination, a casing, and a lubricator supporting follower or riser, and substantially V-shaped resilient means for preventing loss of grease between the riser and the inside of the casing.

16. In a lubricating device, in combination, a casing, and a lubricator supporting follower or riser, said casing having an open bottom with the lower surface of a portion of the perimeter of the casing extended downwardly to form a bearing abutment.

17. In a lubricating device, in combination, a casing, and a lubricator supporting follower or riser, said casing having an open bottom with the lower surface of a portion only of the perimeter of the casing extended downwardly to an extent equal to the descent of the riser.

18. In a lubricating device, in combination, a casing and a lubricator supporting follower or riser, said casing having an open bottom, and a door pivoted adjacent to the lower end of the casing forming a grease retaining abutment during part of the movement of the riser.

19. In a lubricating device, in combination, a casing, and a lubricator supporting follower or riser provided with means bearing on the casing for preventing loss of grease between the riser and the inside of the casing, and a door inset in the casing forming together with said casing a continuous bearing for said bearing means.

20. In a lubricating device, in combination, a casing, and a lubricator supporting follower or riser provided with means bearing on the casing for preventing loss of grease between the riser and the inside of the casing and a door on the casing.

21. In a lubricating device, in combination, a casing, and a lubricator supporting follower or riser, said casing having an open bottom with the lower surface of a portion of the perimeter of the casing extended downwardly to form an abutment serving as end wall for said lubricator supporting follower or riser when it is in its lowered position.

In testimony whereof I have hereunto signed my name.

THOMAS W. DEMAREST.